US009351105B2

(12) United States Patent
Wetzold

(10) Patent No.: US 9,351,105 B2
(45) Date of Patent: May 24, 2016

(54) LOCATION BASED APPLICATIONS

(71) Applicant: Robert Wetzold, Heidelberg (DE)

(72) Inventor: Robert Wetzold, Heidelberg (DE)

(73) Assignee: SAP SE, Walldorf (DE)

( * ) Notice: Subject to any disclaimer, the term of this patent is extended or adjusted under 35 U.S.C. 154(b) by 155 days.

(21) Appl. No.: 13/934,115

(22) Filed: Jul. 2, 2013

(65) Prior Publication Data

US 2015/0011187 A1    Jan. 8, 2015

(51) Int. Cl.
| | | |
|---|---|---|
| *H04M 1/66* | (2006.01) | |
| *H04W 4/02* | (2009.01) | |
| *H04W 24/00* | (2009.01) | |
| *H04W 12/06* | (2009.01) | |

(52) U.S. Cl.
CPC ............ *H04W 4/02* (2013.01); *H04W 12/06* (2013.01)

(58) Field of Classification Search
CPC ....... H04W 12/06; H04W 4/02; H04W 64/00; H04W 4/021; H04W 4/12; H04W 4/001; H04W 4/003; H04L 67/18; H04L 65/40; H04L 67/04; H04L 67/10; H04L 67/306; H04L 67/36; H04L 29/08657; H04L 29/0899; H04L 67/42; H04M 2207/18; H04M 3/42348; H04M 1/72572; H04N 21/25841
USPC .............................................. 455/411, 456.3
See application file for complete search history.

(56) References Cited

U.S. PATENT DOCUMENTS

| | | | |
|---|---|---|---|
| 6,628,938 B1 | 9/2003 | Rachabathuni et al. | |
| 7,283,846 B2 | 10/2007 | Spriestersbach et al. | |
| 7,290,257 B2 | 10/2007 | Henig et al. | |
| 7,487,499 B2 | 2/2009 | Gatz | |
| 7,577,907 B2 | 8/2009 | Vishnia-Shabtai et al. | |
| 7,894,987 B1 | 2/2011 | Tester et al. | |
| 8,229,473 B1 | 7/2012 | De La Rue | |
| 8,265,658 B2 | 9/2012 | Issa et al. | |
| 2003/0013449 A1* | 1/2003 | Hose et al. .................... 455/440 |
| 2004/0023666 A1 | 2/2004 | Moon et al. | |
| 2004/0103117 A1 | 5/2004 | Segler | |
| 2004/0209602 A1* | 10/2004 | Joyce et al. ................. 455/414.1 |
| 2009/0327353 A1* | 12/2009 | Zhuge ................. G06F 11/3419 |
| 2010/0197219 A1* | 8/2010 | Issa et al. ..................... 455/3.06 |
| 2010/0262619 A1* | 10/2010 | Zargahi ..................... G06F 8/61 707/770 |
| 2011/0105150 A1* | 5/2011 | Moon et al. ................. 455/456.3 |
| 2011/0137881 A1* | 6/2011 | Cheng ................. G06F 17/3087 707/706 |
| 2012/0023556 A1* | 1/2012 | Schultz ................... G06F 21/41 726/4 |
| 2012/0042036 A1* | 2/2012 | Lau .......................... G06F 8/61 709/217 |
| 2012/0089465 A1 | 4/2012 | Froloff | |

(Continued)

OTHER PUBLICATIONS

Medagama, Michael, et al., "GIS/GPS/GPRS and Web-based Framework for Fleet Tracking", National conference on Geoinformatics Applications Sri Lanka—2008, 8 pgs.

*Primary Examiner* — Timothy Pham
(74) *Attorney, Agent, or Firm* — Schwegman Lundberg & Woessner, P.A.

(57) ABSTRACT

A server provides location-based applications to an application of a mobile device based on a geographic location of the mobile device. The server receives an application definition and metadata comprising a geographic area associated with the application definition. The server generates a location-based application based on the application definition and metadata. The server identifies a geographic location of the mobile device and one or more location-based applications based on the geographic location of the mobile device. One or more location-based applications are provided within the application in the mobile device.

16 Claims, 9 Drawing Sheets

(56) References Cited

U.S. PATENT DOCUMENTS

| | | | |
|---|---|---|---|
| 2012/0231816 A1* | 9/2012 | Kubo | 455/456.3 |
| 2012/0258696 A1* | 10/2012 | Nam et al. | 455/414.2 |
| 2013/0013356 A1 | 1/2013 | Miller et al. | |
| 2013/0045729 A1 | 2/2013 | Haik et al. | |
| 2013/0054422 A1 | 2/2013 | DeSouza et al. | |
| 2013/0115916 A1* | 5/2013 | Herz | 455/411 |
| 2013/0262626 A1* | 10/2013 | Bozek | H04L 67/10 709/217 |

* cited by examiner

LOCATION BASED APPLICATIONS

FIELD

The present disclosure relates generally to a business networking tool, and in a specific example embodiment, to a meeting scheduling application.

BACKGROUND

Providing an application today usually means developing it in some framework or designer, packaging it, and then uploading it to all supported application stores. Consuming the application requires a user to go to an application store, download and install the application in the mobile device of the user.

BRIEF DESCRIPTION OF DRAWINGS

The appended drawings merely illustrate example embodiments of the present invention and cannot be considered as limiting its scope.

DETAILED DESCRIPTION

Figure 1:
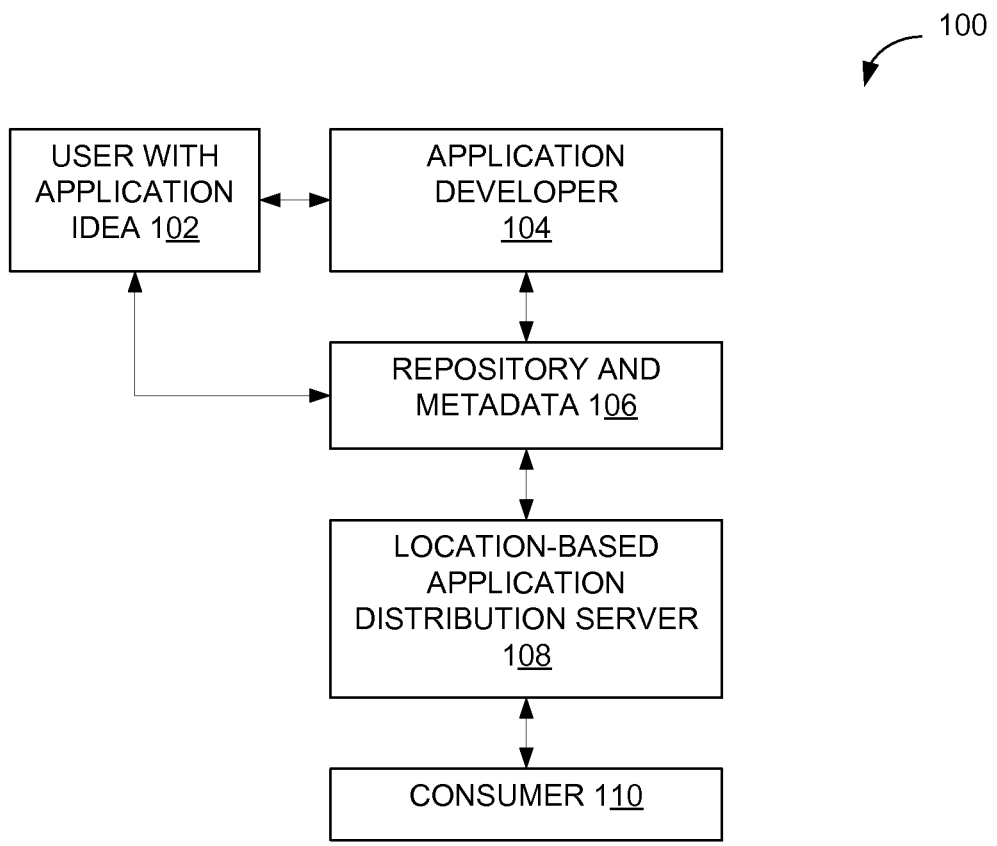
FIG. 1 is a block diagram illustrating an example of a system in which embodiments may be practiced.

The description that follows includes systems, methods, techniques, instruction sequences, and computing machine program products that embody illustrative embodiments of the present invention. In the following description, for purposes of explanation, numerous specific details are set forth in order to provide an understanding of various embodiments. It will be evident, however, to those skilled in the art that embodiments of the inventive subject matter may be practiced without these specific details. In general, well-known instruction instances, protocols, structures, and techniques have not been shown in detail.

In one embodiment, a server provides location-based applications to an application of a mobile device based on a geographic location of the mobile device. The server receives an application definition and metadata comprising a geographic area associated with the application definition. The server generates a location-based application based on the application definition and metadata. The server identifies a geographic location of the mobile device and one or more location-based applications based on the geographic location of the mobile device. One or more location-based applications are provided within the application in the mobile device.

In one example embodiment, the location-based application is rendered based on a source code in the application definition and a library in a storage device of the server. In another example embodiment, the location-based application is rendered based on a set of parameters in the application definition, In one example embodiment, the metadata comprises a time validity parameter. The one or more location-based applications are identified based on the time validity parameter.

In one example embodiment, an identification of the user of the mobile device is authenticated. One or more location-based applications is identified based on the identification of the user of the device.

In another example embodiment, a location-based application within the application in the mobile device is disabled in response to identifying termination conditions being met based on the geographic location of the mobile device. The metadata comprises termination conditions.

In another example embodiment, the application of the mobile device is provided with a list of the one or more location-based applications based on the location of the mobile device. A selection of a location-based application is received from the application of the mobile device. The mobile device is provided with one or more location-based applications based on the selection.

In another example embodiment, the location-based application identifier generates a notification in the mobile device of at least one of the location-based applications based on the location of the mobile device. The at least one of the location-based applications may be displayed in the mobile device. A selection of at least one of the location-based applications is received in response to the notification. The selected location-based applications are sent to the mobile device.

In another example embodiment, the application of the mobile device comprises a local application rendering engine that renders a sub-application of the application based a set of parameters received from the distribution module. The sub-application of the application comprises the location-based application based on the set of parameters.

In another example embodiment, the application of the mobile device comprises a location-based application receiver configured to receive the one or more location-based applications.

In another example embodiment, a non-transitory machine-readable storage device may store a set of instructions that, when executed by at least one processor, causes the at least one processor to perform the method operations discussed within the present disclosure.

FIG. 1 is a block diagram illustrating an example of a system 200 in which embodiments may be practiced. A user 202 with an idea for an application may consult an application developer 204 for assistance in creating a location-based application as part of another application that is already installed on the mobile device of the user (e.g., a location-based distribution application). The application developer 204 may access a location-based application distribution server 208 that includes a central repository of modules and metadata 206 to form the location-based application. The location-based application distribution server 208 generates an application definition and corresponding data of the location-based application, which are provided to the location-based distribution application that is already installed on the mobile device of a consumer 210. As such, the consumer 210 does not need to download another application from the application store 108.

Figure 2:
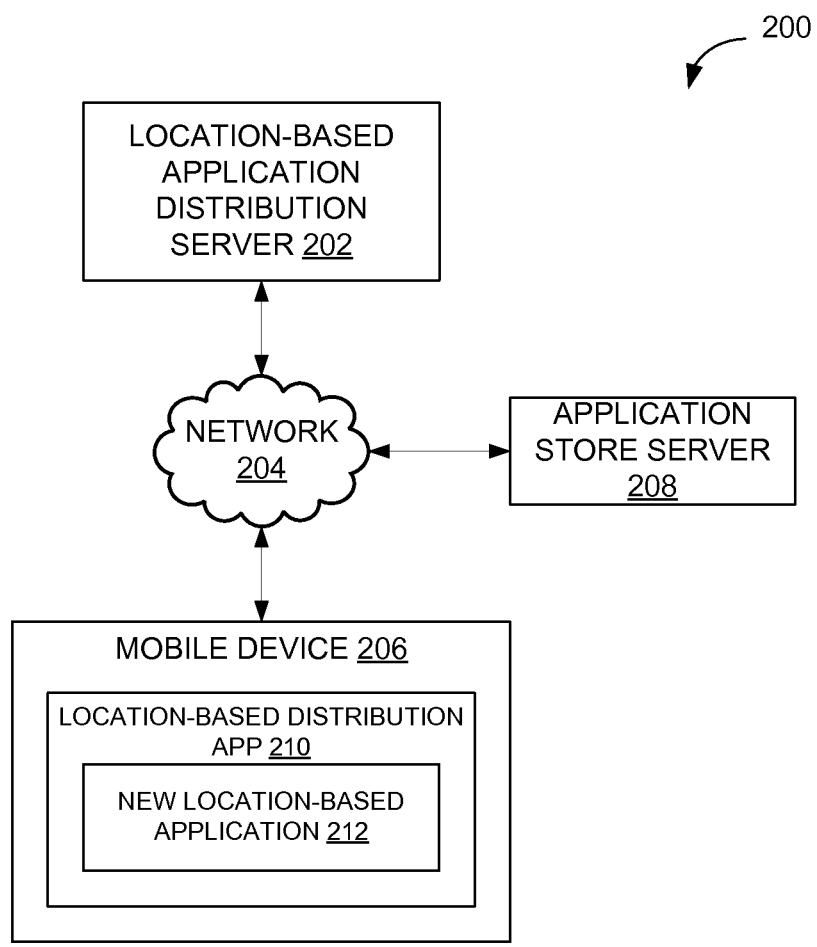
FIG. 2 is a block diagram illustrating an example embodiment of the system of FIG. 1.

FIG. 2 is a block diagram illustrating an example of a system 300 in which embodiments may be practiced. The system 300 includes a location-based application distribution server 302 communicating with a mobile device 306 of a user via a network 304. The mobile device 306 may download a location-based distribution application 310 from an application store server 308. The location-based distribution application 310 may communicate with the location-based application distribution server 302.

In one example embodiment, the location-based application distribution server 302 generates a new location-based application 312 (also referred to as a sub-application of the location-based distribution application 310) to be installed within the location-based distribution application 310. The location-based distribution application 310 is already installed in the mobile device 306. In one embodiment, the new location-based application 312 is communicated via the network 304 from the location-based application distribution server 302 to the location-based distribution application 310 of the mobile device 306 without communication with the application store server 308. In other words, the mobile device 306 downloads the new location-based application 312 directly from the location-based application distribution server 302 and not from the application store server 308.

In another example embodiment, the location-based application distribution server 302 generates application definition and parameters (e.g., source code or packaged data to be processed by a rendering engine in the location-based distribution application 310) that are sent to the location-based distribution application 310 of the mobile device 306. The location-based distribution application 310 renders the new location-based application 312 to be installed . . . within the location-based distribution application 310 of the mobile device 306.

In another example embodiment, the location-based distribution application 310 accesses the new location-based application 312 using Hypertext Markup Language (HTML) Version 5 or any other web-based language from the location-based application distribution server 302.

The mobile device 306 may include a client machine that can execute a web browser or a software application. For example, the web browser may be any browser commonly used to access a network of computers such as the World Wide Web. The web browser may load a user interface to access the location-based application distribution server 302. In another embodiment, access may be performed by the location-based application distribution server 302 where data retrieved from external systems is then stored on the location-based application distribution server 302, and the mobile device 306 can request the data received from external systems.

The mobile device 306 and the location-based application distribution server 302 may be coupled to each other via the network 304. The network 304 enables communication between the mobile device 306 and the location-based application distribution server 302. Accordingly, the network 304 may be a mobile telephone network, a Plain Old Telephone (POTS) network, a wired network, a wireless network (e.g., a WiFi or WiMax network), or any suitable combination thereof. The communication may be based on any communication protocols. Examples of communication protocols include Transmission Control Protocol/Internet Protocol (TCP/IP), HyperText Transfer Protocol (HTTP), File Transfer Protocol (FTP), Simple Mail Transfer Protocol (SMTP), Post Office Protocol (POP), Internet Message Access Protocol (IMAP), Wireless Access Protocol (WAP), Gopher, wireless internet protocols, and instant messaging protocols. The network 304 may be implemented using the Internet, a wide area network (WAN), a local area network (LAN), or any suitable combination thereof.

Figure 3:
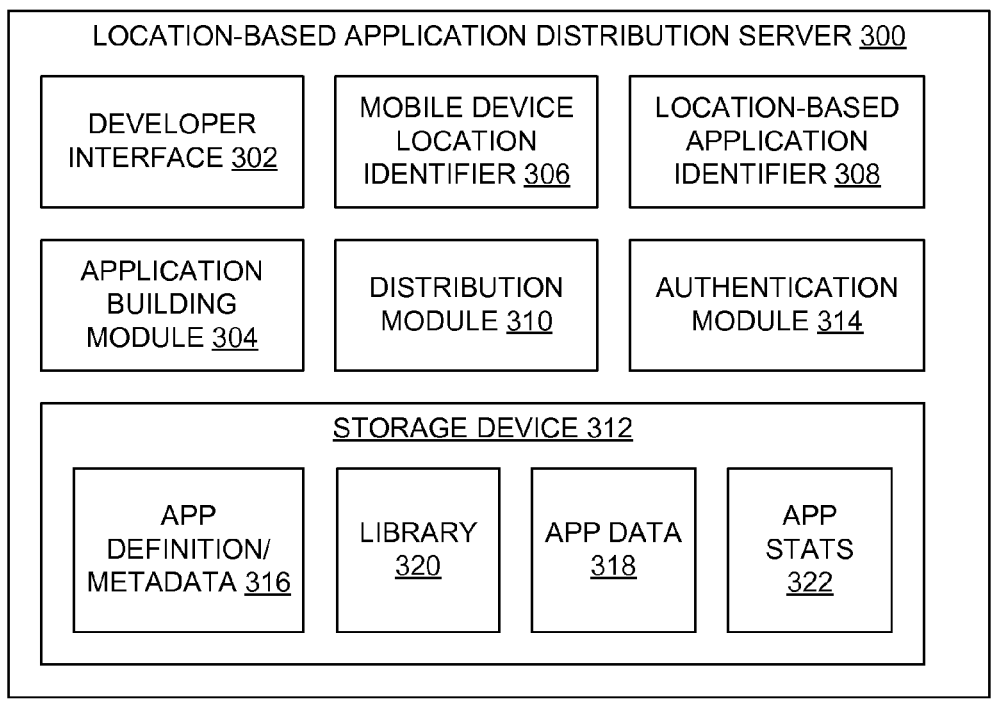
FIG. 3 is a block diagram illustrating an example embodiment of a location-based application distribution server.

FIG. 3 is a block diagram illustrating an example embodiment of a location-based application distribution server 400. The location-based application distribution server 400 includes a developer interface 402, an application building module 404, a mobile device location identifier module 406, a location-based application identifier module 408, a distribution module 410, a storage device 412, and an authentication module 414.

The developer interface 402 may receive an application definition and metadata comprising a geographic area associated with the application definition. The application definition may include, for example, a source code or parameters defining a web-based application. The metadata may also include time information and authentication information. For example, the location-based application may be available for a specific period of time.

In another example, a location-based application may only be available to specific users who have been previously identified. The identified users may be preselected authenticated users (using Single Sign On or any other authentication technique (username and password)).

The application building module 404 may generate a location-based application based on the application definition and metadata. The metadata may include application termination conditions that define conditions for terminating, removing, or disabling the location-based application within the location-based distribution application in the mobile device. In one embodiment, the distribution module 410 may disable the location-based application within the location-based distribution application in the mobile device in response to identifying termination conditions based on the geographic location of the mobile device.

In another embodiment, the application building module 404 generates a location-based application based on the application definition and metadata using a library 420.

The mobile device location identifier module 406 identifies a geographic location of the mobile device. For example, the mobile device location identifier module 406 may receive Global Positioning System (GPS) data from the mobile device.

The location-based application identifier module 408 identifies one or more location-based applications, generated by the application building module 404 based on the geographic location of the mobile device. In one embodiment, the location-based application identifier module 408 provides the location-based distribution application of the mobile device with a list of the one or more location-based applications based on the location of the mobile device. The location-based application identifier module 408 receives a selection of a location-based application from the location-based distribution application of the mobile device. The distribution module 410 then provides the mobile device with the identified one or more location-based applications based on the selection.

In one embodiment, the location-based application identifier module 408 generates a notification in the mobile device of at least one of the location-based applications based on the location of the mobile device. The location-based application identifier module 408 then receives a selection of at least one of the location-based applications in response to the notification. The distribution module 410 then sends the selected location-based applications to the application of mobile device.

The distribution module 410 provides the mobile device with the one or more location-based applications within the location-based distribution application in the mobile device. In another embodiment, the distribution module 410 sends a link to the location-based distribution application for the location-based distribution application to access a corresponding web-based application that implements an operation of the selected location-based application. The corresponding web-based application may be implemented in the location-based application distribution server 400 using the application building module 404.

The storage device 412 stores the application definition and metadata 416, a library 420, application data 418, and application statistics 422. The application definition and metadata 416 may include for example, a source code. The application building module 404 renders the location-based application based on the source code and the modules or building blocks from the library 420. The application building module 404 stores the location-based application, corresponding application data 418, and corresponding application statistics in the storage device 412.

In another embodiment, the storage device 412 is configured to store application definition and metadata 416, application data 418 related to the location-based applications by the application building module 404, application statistics data 420.

In one embodiment, the authentication module 414 authenticates an identification of the user of a mobile device. For example, the authentication module 414 may include different modules for authenticating the user. Each module may be associated with a particular type of authentication. For example, a module may be configured to authenticate a user by communicating credentials of the user with another server. In another example, the authentication module 414 may use a single sign on process to authenticate the user.

The library 420 may include common computer library codes (e.g., User Interface rendering library). As such, common libraries would not need to be loaded each time but could be reused from the device and only the application-related code is downloaded. This saves transfer data bandwidth and would enable rich UIs with only a small overhead that loads very quickly.

Figure 4:
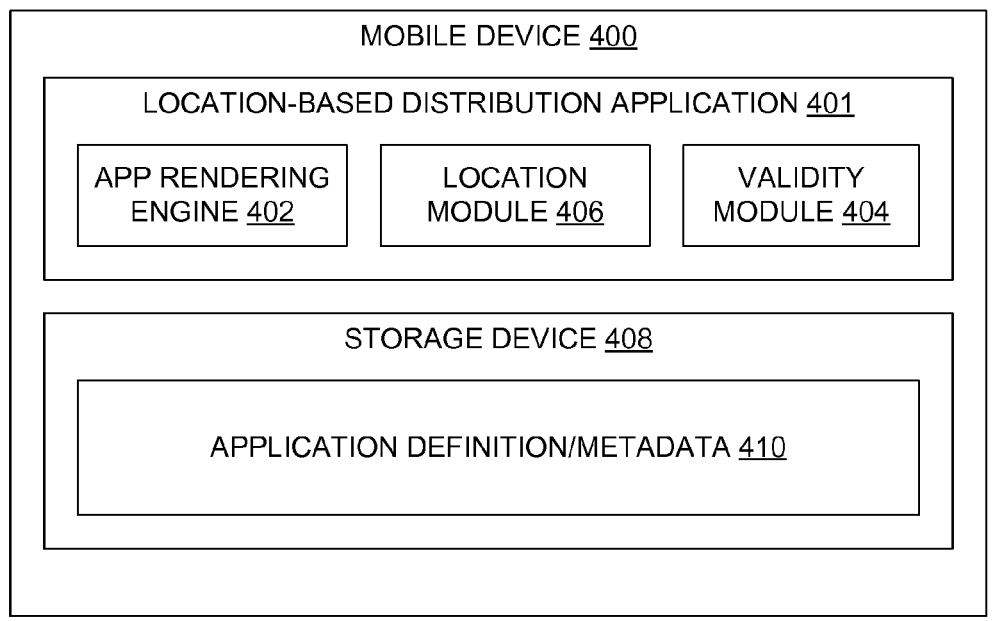
FIG. 4 is a block diagram illustrating an example embodiment of a mobile device.

FIG. 4 is a block diagram illustrating an example embodiment of a mobile device 500. The mobile device 500 may include a location-based distribution application 501 and a storage device 508.

The location-based distribution application 501 in the mobile device 500 may include a local application rendering engine 502, a validity module 504, and a location module 506. The local application rendering engine 502 renders a sub-application of the location-based distribution application 501 based on a set of parameters received from the distribution module 410. The sub-application may include a new location-based application based on the set of parameters. In another example, the location-based distribution application 501 does not render the sub-application and receives the new location-based application from the distribution module 410. In another embodiment, the location-based distribution application 501 accesses the new location-based application using a web-based interface. In other words, the new location-based application may include a web-based location-based application accessed via a web browser of the mobile device 500.

The validity module 504 determines the validity of the sub-application based on the geographic location and a time of usage of the mobile device 500. The location module 506 determines the geographic location of the mobile device 500. For example, a developer of the location-based application could walk through a physical location and scan for existing WiFi identifiers (IDs) which could then also act as location reference in case no or insufficient GPS is available. This WiFi data (WiFi ID and other router identifiers) would then be included in the application meta data. The hosting application on the device would also send its currently detected WiFi IDs to narrow down the results.

The storage device 508 stores application definition and metadata 510. In another embodiment, the storage device 508 may also store the set of parameters received from the distribution module 410.

Figure 5:
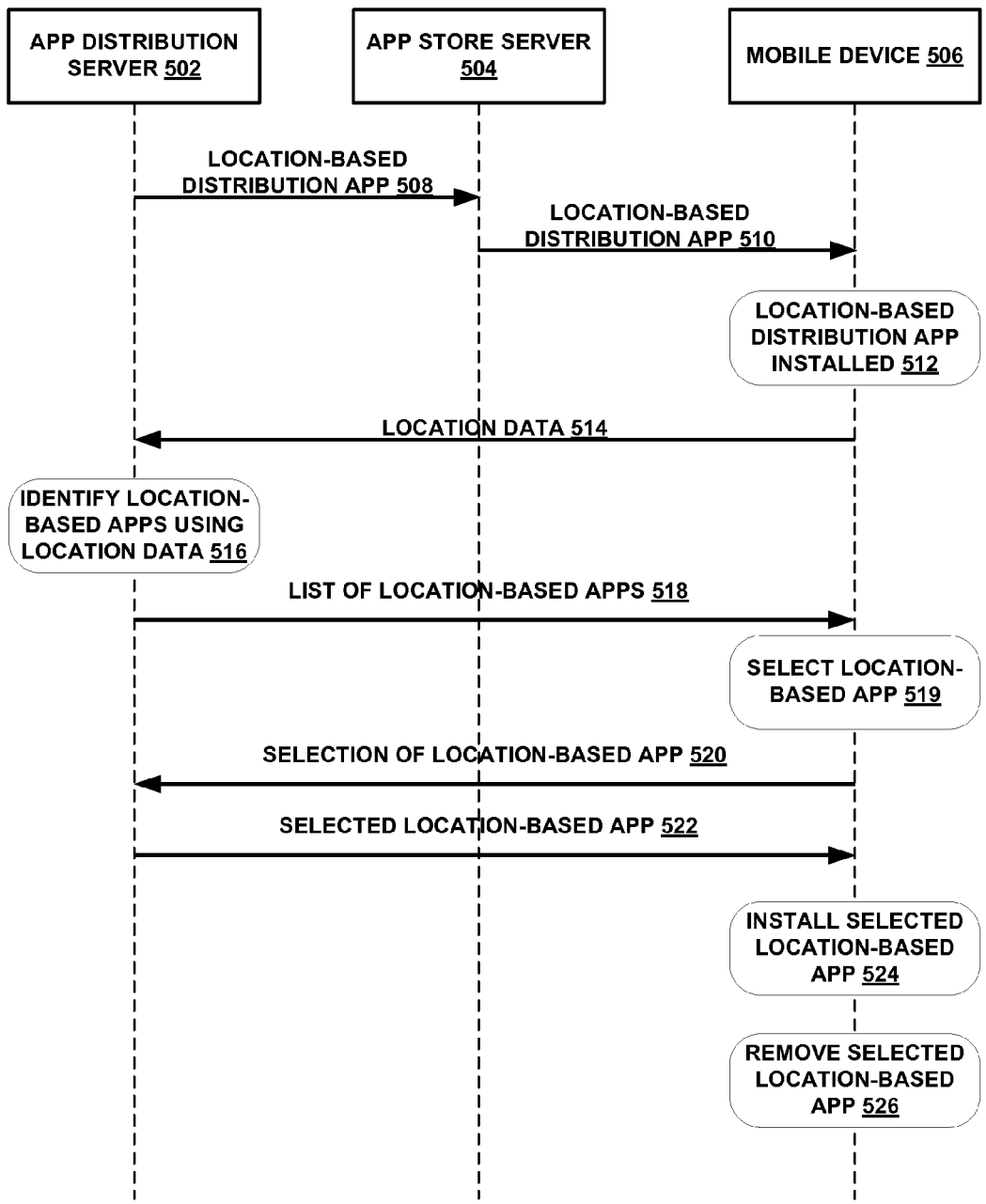
FIG. 5 is a ladder diagram illustrating an example operation of the system of the FIG. 1.

FIG. 5 is a ladder diagram illustrating an example operation of the system of the FIG. 1. An application distribution server 602 provides an application store server 604 with a location-based distribution application at operation 608. A mobile device 606 downloads the location-based distribution application from the application store server 604 at operation 610. The location-based distribution application is then installed in the mobile device 606 at operation 612. At operation 614, geographic location data are provided to the application distribution server 602. At operation 616, the application distribution server 602 identifies location-based applications using the geographic location data of the mobile device 606. At operation 618, the application distribution server 602 provides a list of identified location-based applications to the mobile device 606. At operation 619, a user of the mobile device 606 selects a location-based application from the list of identified location-based applications. At operation 620, the mobile device 606 provides the selection of the location-based application to the application distribution server 602. At operation 622, the application distribution server 602 provides the selected location-based application to the mobile device 606. At operation 624, the mobile device 606 installs the selected location-based application. At operation 626, the selected location-based application is removed from the mobile device 606 when no longer needed (e.g., the geographic location of the mobile device is outside the geographic area associated with the selected location-based application).

Figure 6:
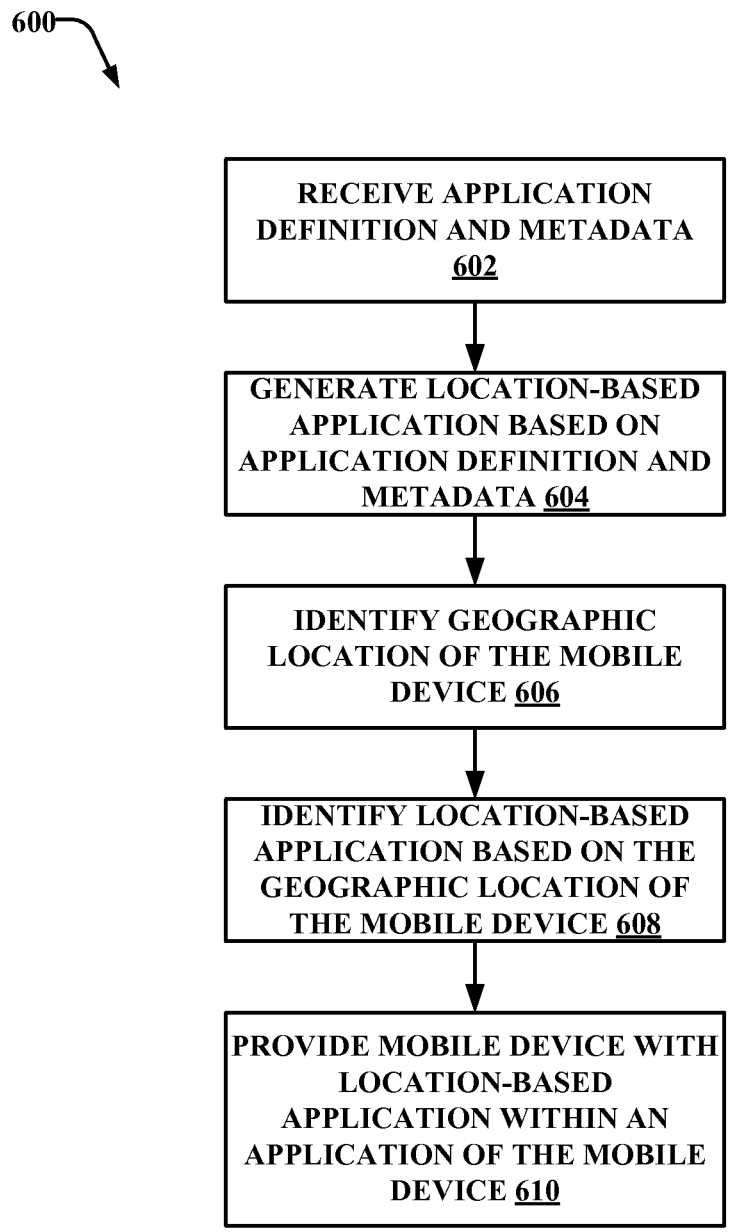
FIG. 6 is a flowchart of a method, in accordance with an example embodiment, for providing a location-based application.
Figure 7:
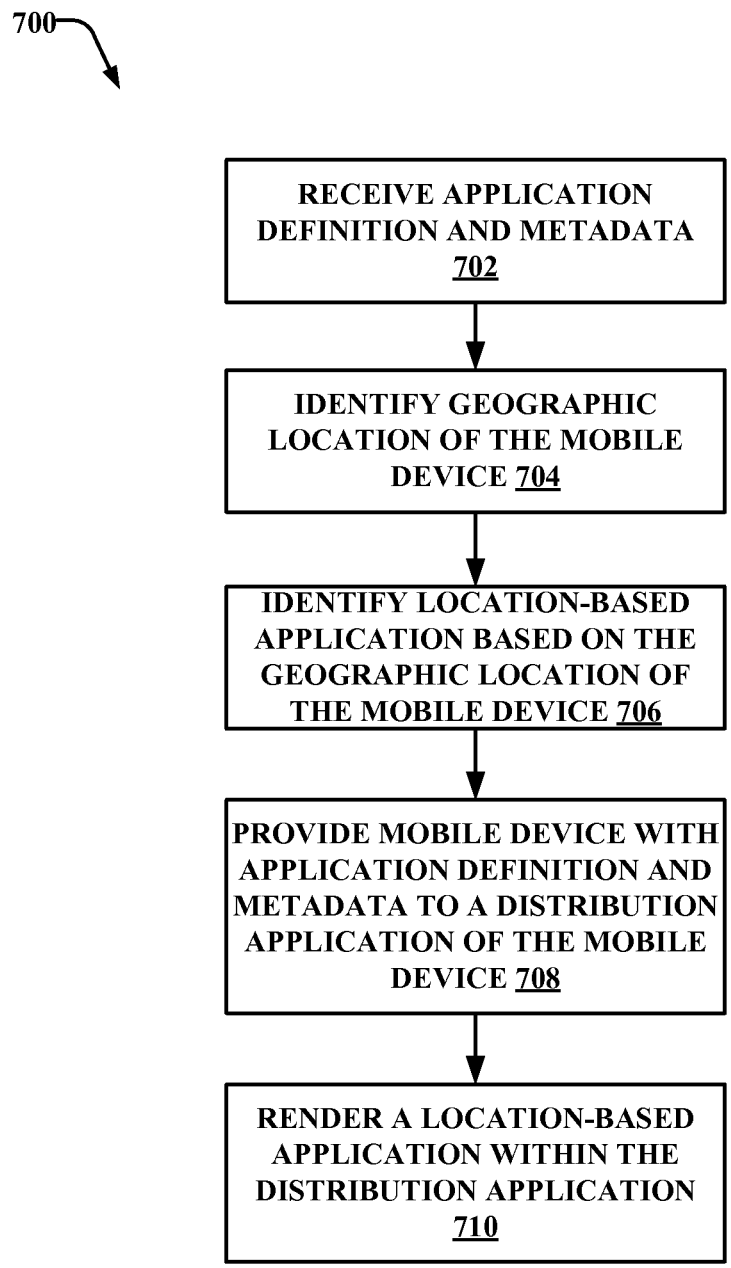
FIG. 7 is a flowchart of a method, in accordance with another example embodiment, for providing a location-based application.

FIG. 6 is a flowchart of a method 700, in accordance with an example embodiment, for providing a location-based application. At operation 702, an application definition and corresponding method data defining a geographic area associated with the application definition is received at the server. In one embodiment, this operation may be implemented using the developer interface 402 of the location-based application distribution server 400 in FIG. 3.

At operation 704, the server generates a location-based application based on the application definition and metadata. In one embodiment, this operation may be implemented using the application building module 404 of the location-based application distribution server 400 in FIG. 3.

At operation 706, the server identifies a geographic location of the mobile device. In one embodiment, this operation may be implemented using the mobile device location identifier module 406 of the location-based application distribution server 400 in FIG. 3.

At operation 708, the server identifies a location-based application based on the geographic location of the mobile device. In one embodiment, this operation may be implemented using the location-based application identifier module 408 of the location-based application distribution server 400 in FIG. 3.

At operation 710, the server provides the mobile device with the location-based application to operate within an application of the mobile device. In one embodiment, this operation may be implemented using the distribution module 410 of the location-based application distribution server 400 in FIG. 3.

Figure 8:
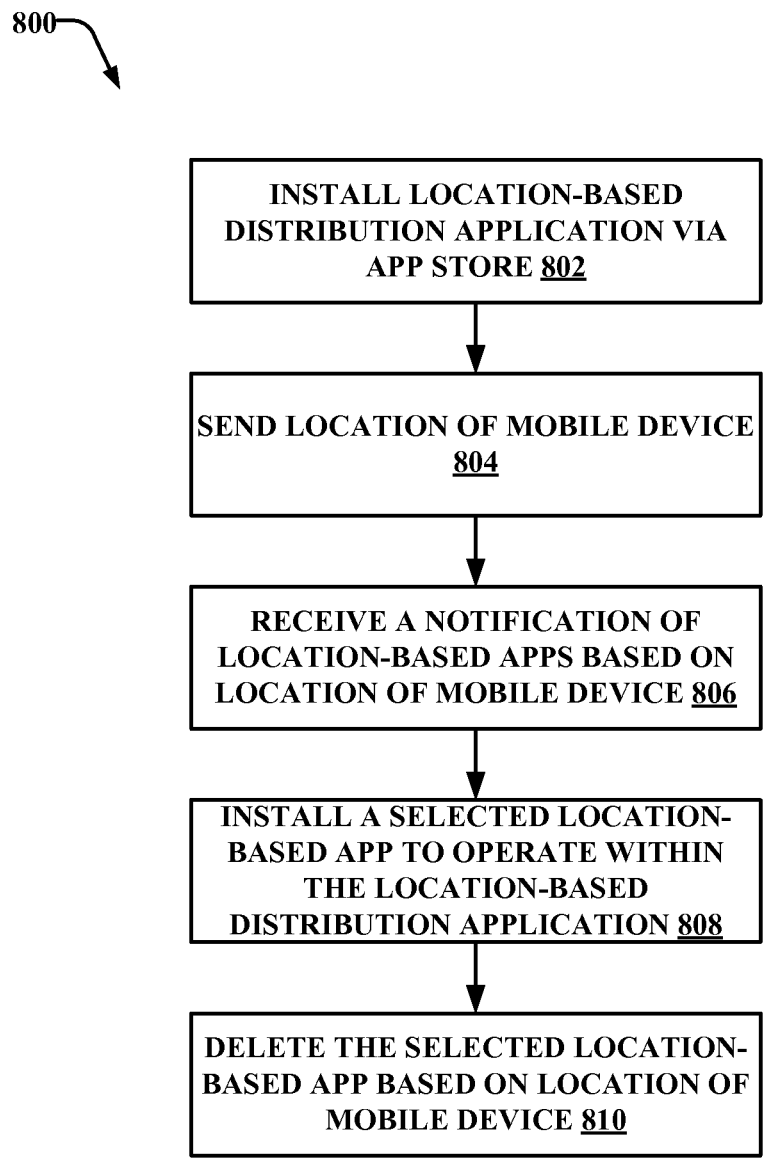
FIG. 8 is a flowchart of a method, in accordance with another example embodiment, for operating a location-based application at a mobile device.

FIG. 8 is a flowchart of a method 800, in accordance with another example embodiment, for providing a location-based application. At operation 802, a server receives application definition and metadata. In one embodiment, this operation may be implemented using the developer interface 402 in FIG. 3.

At operation 804, the server identifies a geographic location of the mobile device. In one embodiment, this operation may be implemented using the mobile device location identifier module 406 in FIG. 3.

At operation 806, the server identifies a location-based application based on the geographic location of the mobile device. In one embodiment, this operation may be implemented using the location-based application identifier module 408 in FIG. 3.

At operation 808, the server provides the mobile device with the application definition and metadata. In one embodiment, this operation may be implemented using the distribution module 410 in FIG. 3.

At operation 810, the mobile device renders a location-based application within the already existing application in the mobile device. In one embodiment, this operation may be implemented using the application rendering engine 502 of the mobile device of 500 in FIG. 4.

FIG. 8 is a flowchart of a method 900, in accordance with another example embodiment, for operating a location-based application at a mobile device.

At operation 902, the mobile device installs a location-based distribution application downloaded from an application store. At operation 904, the geographic location of the mobile device is sent to the location-based application distribution server 400 in FIG. 3. In one embodiment, this operation may be implemented using the location module 506 in FIG. 4.

At operation 906, the mobile device receives a notification of location-based applications based on the geographic location of the mobile device.

At operation 908, the selected location-based application is installed in the location-based distribution application in the mobile device.

At operation 910, the installed selected location-based application is deleted from the mobile device when the mobile device is outside a geographic area associated with the installed selected location-based application.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
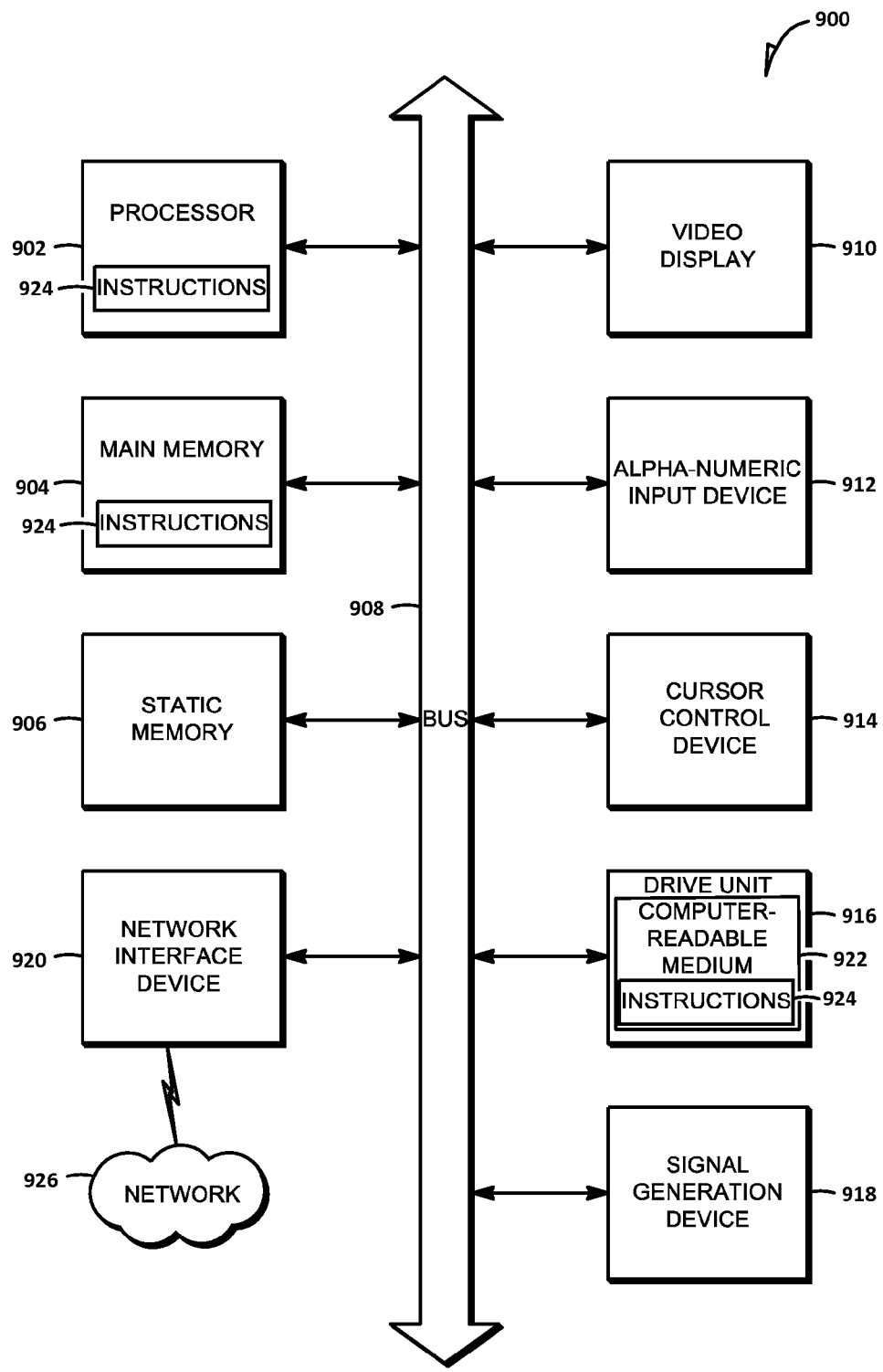
FIG. 9 is a block diagram of a machine in an example form of a computing system within which a set of instructions for causing the machine to perform any one or more of the methodologies discussed herein may be executed.

FIG. 9 is a block diagram of a machine in the example form of a computer system 1000 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media. The instructions 1024 may also reside, completely or at least partially, within the static memory 1006.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
receiving, at a location-based application distribution server, an application definition and metadata comprising a geographic area and a time validity parameter associated with the application definition, the application definition and the metadata corresponding to an application distributed by an application store server to a mobile device;
generating at least one location-based application based on the application definition and metadata;
identifying a geographic location of mobile device using the distributed application in the mobile device;
selecting, at the location-based application distribution server, one or more of the generated location-based applications based on the geographic location of the mobile device, the time validity parameter and an identification of a user of the mobile device;
providing the mobile device with the selected location-based applications within the distributed application in the mobile device, the selected location-based applications being provided by the location-based application distribution server independently of the application store server; and
rendering the selected location-based applications by the distributed application based on a source code in the application definition and a library in a storage device of the location-based application distribution server.

2. The method of claim 1, further comprising:
rendering the selected location-based applications based on a set of parameters in the application definition corresponding to the application distributed by the application More server.

3. The method of claim 1, further comprising: authenticating, at the location-based application distribution server, the identification of the user of the mobile device.

4. The method of claim 1; further comprising:
disabling at least one of the selected location-based applications within the distributed application in the mobile device in response to identifying termination conditions being met based on the geographic location of the mobile device, the metadata comprising termination conditions.

5. The method of claim 1, the selecting further comprising:
providing the distributed application in the mobile device with a list of the generated location-based applications based on the location of the mobile device; and
receiving, at the location-based application distribution server, a selection of a generated location-based application from the list by the user via the distributed, application in the mobile device.

6. The method of claim 1, the selecting further comprising:
generating a notification in the mobile device of at least one of the generated location-based applications based on the location of the mobile device; and
receiving, at the location-based application distribution server, a selection of at least one of the generated location-based applications from the notification by the user via the distributed application in the mobile device.

7. The method of claim 1, wherein the distributed application in the mobile device comprises a local application rendering engine configured to render a sub-application of the distributed application based on a set of parameters received from a distribution module of the location-based application distribution server, the sub-application of the distributed application comprising one of the selected location-based applications based on the set of parameters.

8. The method of claim 1, wherein the distributed application in the mobile device comprises a location-based application receiver configured to receive the one or more selected location-based applications from the location-based application distribution server.

9. A server comprising:
a processor comprising a developer interface, an application building module, a mobile device location identifier module, a location-based application identifier module, and a distribution module;
the developer interface configured to receive an application definition and metadata comprising a geographic area and a time validity parameter associated with the application definition, the application definition and the metadata corresponding to an application distributed by an application store server to a mobile device;

the application building module configured to generate at least one location-based application based on the application definition and metadata;

the mobile device location identifier module configured to identify a geographic location of the mobile device using the distributed application in the mobile device;

the location-based application identifier module configured to select one or more of the generated location-based applications based on the geographic location of the mobile device, the time validity parameter and an identification of a user of the mobile device;

the distribution module configured to provide the mobile device with the one or more selected location-based applications within the distributed application in the mobile device; and the application building module is further configured to render the selected location-based applications using the distributed application based on a source code in the application definition and a library in a storage device of the server.

10. The server of claim 9, wherein the application definition comprises a set of parameters, and wherein the application building module comprises an application rendering engine configured to render the selected location-based applications based on the set of parameters.

11. The server of claim 9, further comprising:
an authentication module configured to authenticate the identification of the user of the mobile device.

12. The server of claim 9, wherein the metadata comprises application termination conditions, the distribution module configured to disable at least one of the selected location-based application within the distributed application in the mobile device in response to identifying termination conditions being met based on the geographic location of the mobile device.

13. The server of claim 9, wherein the location-based application identifier module is configured to provide the distributed application in the mobile device with a list of the generated location-based applications based on the location of the mobile device, and to receive a selection of a generated location-based application from the list by the user via the distributed application in the mobile device.

14. The server of claim 9, wherein the location-based application identifier module is configured to generate a notification in the mobile device of at least one of the generated location-based applications based on the location of the mobile device, and to receive a selection of at least one of the generated location-based applications from the notification by the user via the distributed application in the mobile device.

15. The server of claim 9, wherein the distributed application in the mobile device comprises:
a local application rendering engine configured to render a sub-application of the distributed application based on a set of parameters received from the distribution module, the sub-application of the distributed application comprising one of the selected location-based applications based on the set of parameters.

16. A non-transitory machine-readable storage medium storing instructions which, when executed by at least one processor, performs operations comprising:
receiving, at a location-based application distribution server, an application definition and metadata comprising a geographic area and a time validity parameter associated with the application definition, the application definition and the metadata corresponding to an application distributed by an application store server to a mobile device;

generating at least one location-based application based on the application definition and metadata;

identifying a geographic location of the mobile device distribute application in the mobile device;

selecting, at the location-based application distribution server, one or more of the generated location-based applications based on the geographic location of the mobile device, the time validity parameter and an identification of a user of the mobile device;

providing the mobile device with the selected location-based applications within the distributed application in the mobile device, the selected location-based applications being provided by the location-based application distribution server independently of the application store server; and rendering the selected location-based applications by the distributed application based on a source code in the application definition and a library in a storage device of the location-based application distribution server.

* * * * *